July 2, 1946. W. A. MORSE 2,402,974
SWIVELED AND SHOCK ABSORBING SEAT CONSTRUCTION FOR VEHICLES
Filed Nov. 17, 1944
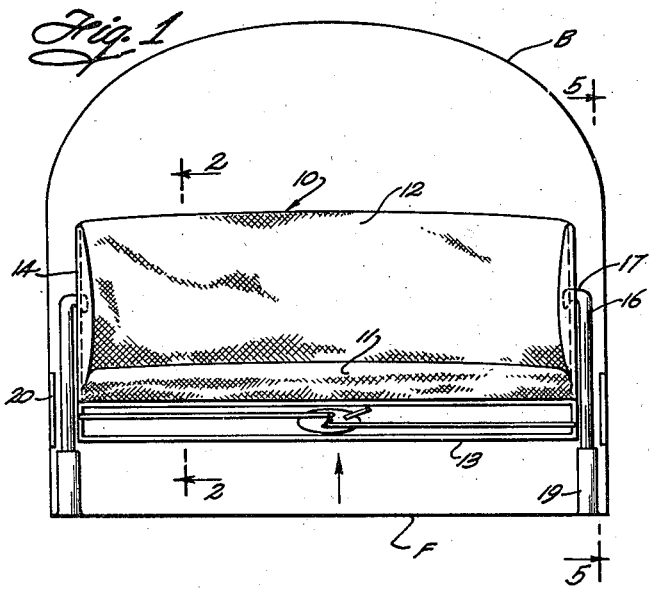
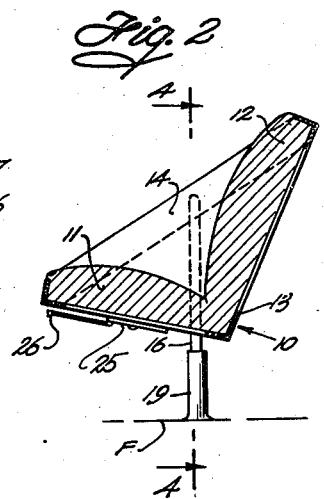
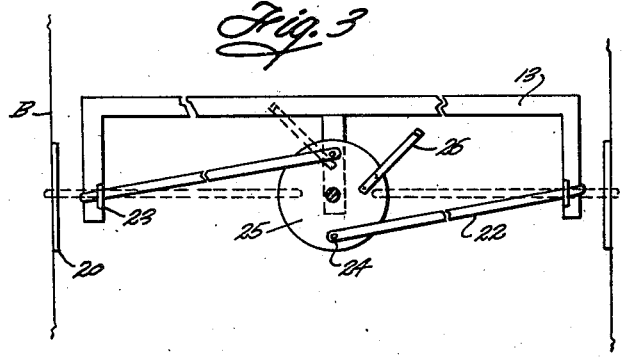
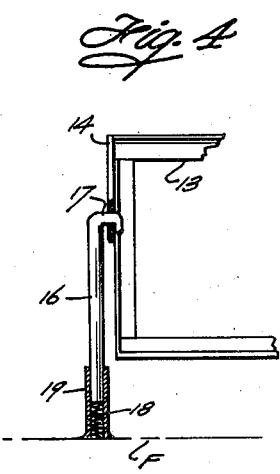
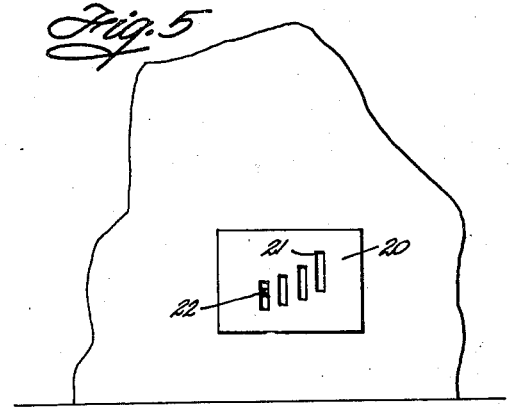
Inventor
WILLIAM A. MORSE
By Hazard and Miller
Attorneys Patented July 2, 1946

2,402,974

UNITED STATES PATENT OFFICE 2,402,974

SWIVELED AND SHOCK ABSORBING SEAT CONSTRUCTION FOR VEHICLES

William A. Morse, Santa Monica, Calif.

Application November 17, 1944, Serial No. 563,854

2 Claims. (Cl. 155—9)

This invention relates to improvements in seats for vehicles such as for example the rear seat of an automobile.

An object of the invention is to provide a seat for a vehicle such as the rear seat of an automobile which is resiliently supported upon the body of the automobile. In the conventional automobile construction the body is spring supported by the rear springs of the chassis. In traversing rough roads these rear springs of the chassis, even though snubbed by snubbers or shock absorbers, are frequently inadequate in that the rear portion of the automobile body is caused to be raised and lowered due to the unevenness of the road despite the presence of the rear springs, snubbers or shock absorbers. This effect is automatically much more noticeable in the rear seat than in the driver's seat.

An object of the present construction is to provide a rear seat for an automobile or other vehicle wherein the rear seat is resiliently supported on the body so that even though the body, despite the presence of the springs of the chassis, is raised and lowered by the unevenness of the road, the seat will have an opportunity to remain in a more stationary position.

Another object of the invention is to provide a rear seat for an automobile or other vehicle wherein the seat is resiliently supported on the body and is pivotally mounted on its ports for swinging movement about an axis above its center of gravity and to provide a means for optionally locking the seat against such swinging movement although permitting the seat to move up and down relatively to the body by reason of its resilient support. Where seats are stationarily mounted within the body of an automobile, sudden upward movements of the body tend to throw the passengers sitting on the seat upwardly in a direction that is somewhat affected by the inclination or position of the seat. By having the seat pivotally supported the position of the seat can be varied to accommodate the desires of the passengers and by locking the seat against pivotal movement, but permitting it to still rise and fall relatively to the body, inert loads positioned on the seat may be readily maintained thereon.

With the foregoing and other objects in view which will be made manifest in the following detailed description and specifically pointed out in the appended claims, reference is had to the accompanying drawing for an illustrative embodiment of the invention, wherein;

Fig. 1 is a front view in elevation of a rear seat of an automobile embodying the present invention;

Fig. 2 is a vertical section taken substantially upon the line 2—2 upon Fig. 1.

Fig. 3 is an enlarged view in elevation illustrating the details of construction of the locking mechanism.

Fig. 4 is a partial view in vertical section taken substantially upon the line 4—4 upon Fig. 2 in the direction indicated.

Fig. 5 is a partial view in elevation of the inside of the body of the automobile and may be regarded as having been taken substantially upon the line 5—5 upon Fig. 1.

Referring to the accompanying drawing wherein similar reference characters designate similar parts throughout, the seat which forms a part of the construction embodying the present invention is generally indicated at 10 having a seat portion 11 and a back rest portion 12. These portions may be constructed upon any suitable framework 13 so that they are rigid with each other. If desired diagonal braces 14 may connect the top of the back rest portion with the forward portion of the seat or any other suitable construction may be provided at the end of the seat from which the seat may be suspended. As illustrated upon the drawing, the back rest portion and seat portion 11 may be upholstered or equipped with springs in any conventional or preferred manner.

This seat instead of being rigidly or permanently installed within the body b of the automobile or other vehicle is resiliently supported therein, preferably from the floor of the body. To this end a pair of supporting posts 16 are provided, having inwardly extending upper ends 17 which extend through apertures in the braces 14 so as to pivotally suspend or support the seat for swinging movement about an axis above its center of gravity. These supporting posts are in turn supported upon springs 18 disposed within suitable sockets 19 that are mounted on the floor f of the vehicle. A means is provided for optionally locking the seat against swinging movement in any adjusted position to which it may be swung by means of its pivotal connection with the supporting posts 16. To this end a suitable plate indicated at 20 may be mounted on the interior of the body b at each side of the seat. These plates have a plurality of slots 21 cut or otherwise formed therein adapted to receive the ends of the locking bolts 22. The locking bolts 22 are slidable through suitable journals or bearings 23 and have their inner ends pivotally connected as at 24 to opposite sides of a rotary crank 25 suitably supported on the underside of the seat. This crank may have at its forward end, a suitable handle 26.

The operation and advantages of the above described construction are as follows: Although the rear portion of the body of the automobile may move up and down to a considerable extent in traversing rough roads, the rear seat being resiliently supported on the springs 18 will tend to remain stationary. When the locking mechanism is released as is indicated in Fig. 3, the rear seat may swing about an axis disposed above its center of gravity. Consequently the position of the seat, that is the inclination of the seat portion 11 and the back rest portion 12 may be varied and if desired the seat may be permitted to swing freely while being resiliently supported on the floor f. In this manner the passenger may adjust the seat to his own convenience which tends to modify or control the manner in which he may be thrown when the automobile is traversing severe bumps. If it is desired to dispose an inert load on the rear seat so that such load will not tip the seat and roll or slide therefrom, the seat may be locked in any adjusted position by rotating the crank 25 by its handle 26. When this crank is rotated the latches or locked bars 22 will be simultaneously projected as indicated in dotted lines on Fig. 3 and may be caused to enter either of the slots 21. These slots which are vertically elongated will enable the entering ends of the locking bars to rise and fall therein so that the seat will still be resiliently supported on the spring 18, although the seat is held against swinging. It will, of course, be appreciated that the supporting columns or bars 16 may be suitably enclosed and surrounded by ornamental structure or if desired they may be recessed in the walls of the body b so that there is no objectionable space between the ends of the seat and the body.

Various changes may be made in the details of construction without departing from the spirit and scope of the invention as defined in the appended claims, wherein:

I claim:

1. In a vehicle body construction, a seat, a pair of supports at the sides of the seat, means resiliently mounting the supports on the body of the vehicle for up and down movement relatively thereto, said supports being pivotally connected to the seat at the sides thereof for swinging movement of the seat relatively thereto, and means for locking the seat against swinging movement relatively to said supports, said locking means providing for movement of the seat up and down upon said resilient mounting.

2. In a vehicle body construction, a seat, a pair of supports at the sides of the seat, means resiliently mounting the supports on the body of the vehicle for up and down movement relatively thereto, said supports being pivotally connected to the seat at the sides thereof for swinging movement of the seat relatively thereto, and means for locking the seat against swinging movement relatively to said supports, said locking means providing for movement of the seat up and down upon said resilient mounting, said means being operable from the bottom of the seat adjacent the forward end thereof.

WILLIAM A. MORSE.